Patented July 15, 1924.

1,501,427

UNITED STATES PATENT OFFICE.

SAMUEL WILSON, OF BROOKLYN, NEW YORK.

COMPOSITION FOR THE DESTRUCTION OF INSECTS, FUNGI, AND THE LIKE AND METHOD OF APPLYING THE SAME.

No Drawing.   Application filed September 21, 1922.   Serial No. 589,696.

*To all whom it may concern:*

Be it known that I, SAMUEL WILSON, a citizen of the United States of America, residing at Brooklyn, county of Kings, State of New York, have invented certain new and useful Improvements in Compositions for the Destruction of Insects, Fungi, and the like and Methods of Applying the Same; and I do hereby declare the following to be a full, clear, and exact description of the invention, such as will enable others skilled in the art to which it appertains to make and use the same.

This invention relates to compositions for the destruction of insects, fungi and the like, on trees, plants or other objects, and to a method of applying the same.

Such substances have heretofore been applied either as dusts or as sprays, the latter being essentially fine mists of liquid droplets and air formed by the forcing of air under pressure through a receptacle containing the liquid in which the insecticide or fungicide to be applied may be contained in solution or suspension, or in both conditions.

One of the principal disadvantages attending the application of insecticides in the form of sprays is the lack of uniformity in the composition of the material, as a result of which, portions of the plant substance are harmed by too high concentrations of the active ingredients of the insecticide or fungicide while other portions of the plant substance are ineffectively treated owing to too low a concentration thereof. Owing to the lack of adhering power to the usual smooth and waxy surfaces of leaves and petals, as well as to the undersides thereof, a sufficiently long and intimate contact of the insecticide or fungicide is frequently not secured. Moreover a fall of rain occurring soon after the application of the dusts or sprays will often nullify their effect by washing away from the plant or tree surface the active ingredients.

This invention has for its general objects the provision of compositions for the destruction of insects, fungi and the like and a method of applying the same to give a more uniform distribution of the active ingredients and a more prolonged and intimate contact between them and the surface of the object to be treated, as well as a greater area of contact with the surface and a greater spreading power for the same amount of material.

In accordance with the invention the insecticides or fungicides are applied in the form of a substantially permanent, adhering foam which is formed at or near the surfaces by the combination of any solutions suitable for producing the gaseous phase of the foam, which may itself function as an insecticide or fungicide either in combination with another agent or by itself. The gaseous phase of the foam is surrounded by a liquid phase containing the products resulting from the formation of the gas, an added foam maintaining agent and the insecticide or fungicide, in case the latter is used either with or without the use of a toxic gas for producing the foam. Not only does the foam form a tenacious blanket which smothers air breathing insects, but it impedes the movement of their legs and wings and makes them particularly subject to the action of such other insecticides as may be present in the foam.

In general, the compositions for most satisfactorily practicing the method consists of two separate portions which when dissolved in proper proportions of water and mixed at or near the object to be treated will form a tenacious and durable foam, having preferably as its gaseous phase a gas which is toxic to insects, such as carbon dioxide, hydrocyanic acid, sulphur dioxide or the like.

For a carbon dioxide foam the two components are preferably aluminum sulphate and sodium bicarbonate, the latter being slightly in excess of its stoichiometrical proportions if required by the condition of the water used or the nature of the insecticide.

Any suitable foam maintaining agent may be used, such as saponin-like or albuminous material with or without resin or fish-oil soap or the like.

If aluminum sulphate and sodium bicarbonate are used for generating the foam producing gas the saponin should preferably be mixed with the aluminum sulphate portion of the composition while materials such as resin or fish-oil soap should preferably be mixed with the sodium bicarbonate portion.

The insecticide or fungicide which may be used either in addition to the toxic, foam-producing gas, or as the only destructive agent, may be mixed with either component, but preferably it should be mixed with the component in the presence of which it is most stable. For instance, substances such as nicotine, hellebore, copper sulphate, sulphur and Paris green are best mixed with the aluminum sulphate component, while substances such as cyanides, lead arsenate, sodium sulphide and soaps are best added to the sodium bicarbonate portion.

Substances which in themselves are not desirable insecticides or fungicides may be separately contained in the two portions and the desired insecticide or fungicide formed by their interaction together with the formation of foam, for instance copper sulphate may be added to the aluminum sulphate portion and ammonium hydroxide and carbonate to the sodium bicarbonate portion, whereby on mixing the two solutions a fungicide comparable to the well known Burgundy mixture is formed.

The substances which go to make up the desired composition will be intimately mixed in finely divided condition and maintained in separate portions until they are to be used. They are then dissolved in proper quantities of water and the separate solutions thus formed are mixed at or near the object to be treated to produce the foam.

As an illustration of a particular composition well adapted for accomplishing the objects of the invention, the following may be given, A representing the aluminum sulphate portion and B the sodium bicarbonate portion. The quantities given are for twenty-five gallons of solution for each portion, but increased or decreased dilutions may be used according to the conditions existing in practice.

A

Aluminum sulphate____ 3 pounds.
Nicotine sulphate_____ ½ ounce.
Saponin_____ ¾ ounce.

B

Sodium bicarbonate____ 5 pounds.
Resin soap_____ 4 pounds.
Sodium cyanide_____ 1 pound.

As modifications of the above, four pounds of copper sulphate or four pounds of Paris green may be used in addition to or as a substitute for the nicotine sulphate in portion A. In portion B four pounds of finely ground lead arsenate or three pounds of ferric arsenate may be used in addition to or as a substitute for the sodium cyanide.

In all cases the proportions and nature of the constituents of the composition may be varied as required for the most effective destruction of the particular insects or fungi to be attacked and the resistance offered to the compositions by different plants and trees.

Since the adhering qualities of a foam are much greater than are those of dusts and sprays the required duration and intimacy of contact of the insecticide or fungicide with the surface to be treated to accomplish the best results is secured. These adhering qualities also cause the foam to cling to all surfaces to which it may be applied, which is of especial advantage in the treatment of foliage, as in many cases the pests which infest the same are upon the lower surfaces of the leaves, and spraying or dusting methods fail to reach them effectively.

It will also be understood that various other changes in the details of the invention may be made without departing from the principle thereof as defined in the appended claims.

I intend that the term "a substantially permanent, adhering foam" used in the foregoing specification and in the appended claims shall distinguish from materials in a condition well known in the arts, especially in connection with the extinguishing of fires in which a layer of tenacious foam is caused to be deposited on the surfaces of harming objects or adjacent thereto. The term is further intended to distinguish from that phase of foaming which may generally occur in the use of certain insecticidal sprays and in which any foam that is produced is in no way permanent, because the bubbles rapidly disappear and in a short time after depositing no foam will be apparent.

I claim:—

1. A composition for the destruction of insects, fungi or the like, consisting of separate portions containing foam producing and maintaining ingredients and at least one of which contains an insecticide or fungicide, said ingredients being adapted when brought together to form a substantially permanent, adhering foam for holding the insecticide or fungicide in intimate contact with the objects to be treated.

2. A composition for the destruction of insects, fungi or the like, consisting of separate portions containing the constituents of an insecticide or fungicide and foam producing and maintaining ingredients, said constituents and ingredients being adapted when brought together to form an active insecticide or fungicide and a substantially permanent, adhering foam for holding the insecticide or fungicide in intimate contact with objects to be treated.

3. A composition for the destruction of insects, fungi or the like, consisting of separate portions containing ingredients for producing and maintaining a foam having an insecticidal or fungicidal gas as its gaseous phase, one at least of said portions containing an insecticide or fungicide, and said ingredients being adapted when brought together to form a substantially permanent, adhering, toxic foam for holding the insecticide or fungicide in intimate contact with objects to be treated.

4. A composition for the destruction of insects, fungi or the like, consisting of separate portions containing the constituents of an insecticide or fungicide and ingredients for producing and maintaining a foam having an insecticidal or fungicidal gas as its gaseous phase, said constituents and ingredients being adapted when brought together to form an active insecticide or fungicide and a substantially permanent, adhering, toxic foam for holding the insecticide or fungicide in intimate contact with objects to be treated.

5. A composition for the destruction of insects, fungi or the like, consisting of separate portions containing foam producing and maintaining ingredients and one of which contains a cyanide, said ingredients being adapted when brought together to form a substantially permanent, adhering foam having hydrocyanic acid as a destructive agent.

6. A composition for the destruction of insects, fungi and the like, consisting of two separate portions one of which contains aluminum sulphate, nicotine sulphate and saponin and the other of which contains sodium bicarbonate, resin soap and sodium cyanide, said portions being adapted when brought together in solution to form and maintain a foam containing a destructive agent.

7. A composition for the destruction of insects, fungi and the like, consisting of two separate portions one of which contains aluminum sulphate, nicotine sulphate and saponin in the proportions of substantially three pounds of aluminum sulphate, one-half ounce of nicotine sulphate and three-quarters of an ounce of saponin, and the other of which contains sodium bicarbonate, resin soap and sodium cyanide in the proportions of substantially five pounds of sodium bicarbonate, four pounds of resin soap and one pound of sodium cyanide.

8. The method of applying an insecticide, fungicide or the like to objects to be treated therewith, which consists in depositing on the objects a substantially permanent, adhering foam containing the insecticide or fungicide and produced by combining foam producing and maintaining ingredients in the vicinity of the objects.

9. The method of applying an insecticide, fungicide or the like to objects to be treated therewith, which consists in incorporating the constituents of the insecticide or fungicide in separate foam producing and maintaining ingredients and combining the constituents and ingredients in the vicinity of the objects to cause a substantially permanent adhering foam containing the insecticide or fungicide to be deposited thereon.

10. The method of treating objects with hydrocyanic acid for the destruction of insects, which consists in depositing on the objects a substantially permanent, adhering foam containing said acid and produced by combining in the vicinity of the objects foam producing and maintaining ingredients and hydrocyanic acid forming materials.

In testimony whereof I affix my signature.

SAMUEL WILSON.